A. G. POWELL.
Improvement in Cotton Choppers.
No. 122,057.   Patented Dec. 19, 1871.
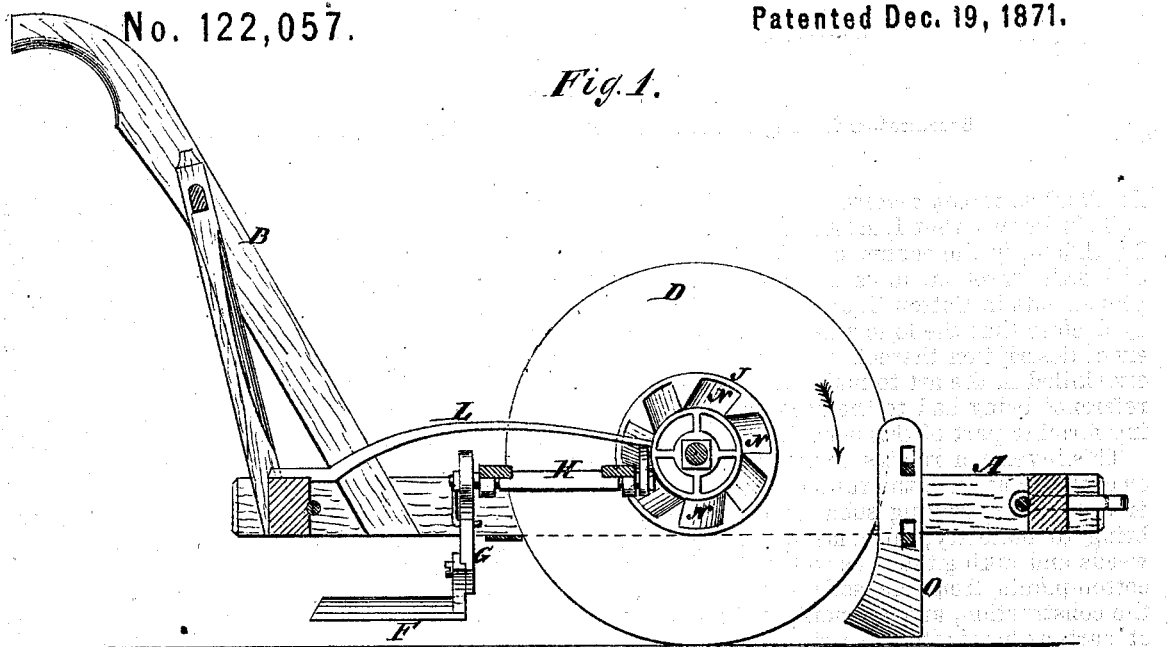
Fig. 1.
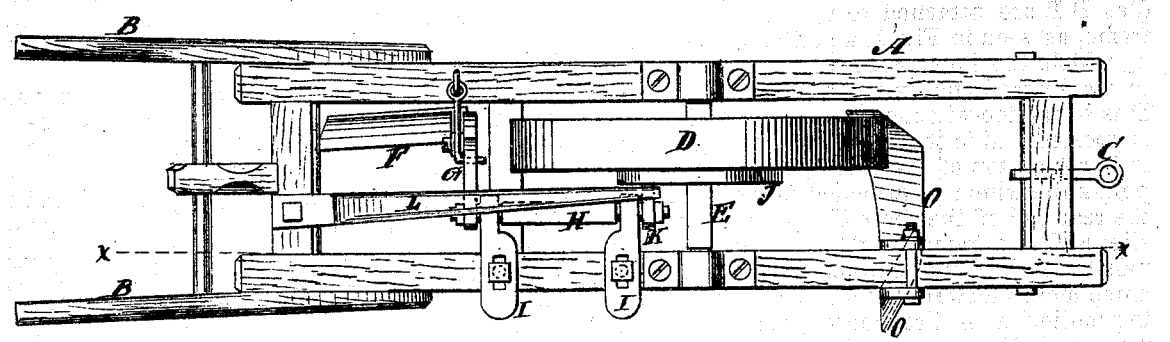
Fig. 2.
Fig. 3.
Witnesses:   Inventor:

// 122,057

UNITED STATES PATENT OFFICE.

ASHLEY G. POWELL, OF SMITHFIELD, NORTH CAROLINA.

IMPROVEMENT IN COTTON-CHOPPERS.

Specification forming part of Letters Patent No. 122,057, dated December 19, 1871.

*To all whom it may concern:*

Be it known that I, ASHLEY G. POWELL, of Smithfield, in the county of Johnston and State of North Carolina, have invented certain Improvements in Cotton-Choppers; and I do hereby declare that the following is a full, clear, and exact description thereof, which will enable others skilled in the art to make and use the same, reference being had to the accompanying drawing forming part of this specification.

This invention relates to means for chopping or cutting out from the rows of cotton a portion of the plants, leaving such as it is desired to bring to maturity; also, means for destroying weeds and raking them, as well as the destroyed cotton-plants, from the soil; and it consists in the construction, arrangement, and combination of parts as hereinafter described.

In the accompanying drawing, Figure 1 represents a vertical longitudinal section of the machine taken on the line $x\ x$ of Fig. 2. Fig. 2 is a top view. Fig. 3 is a view of the rake.

Similar letters of reference indicate corresponding parts.

A is a rectangular frame, of wood. The handles B B are attached to the rear end of this frame, as seen in Fig. 1, and the horse or mule by which the implement is drawn is attached to the forward end by means of the draft-rod C. D is a traction-wheel on which the implement is supported. E is the wheel-shaft which revolves in boxes on top of the frame A. F is the chopping-knife which is attached to the arm G on the rear end of the shaft H. This shaft is parallel with the frame A, and is supported on journals by the adjustable brackets I I. As the machine moves forward the knife is given a vibrating motion in a direction at right angles with motion of the machine. The knife strikes into the soil at each vibration, having much the action of a hoe used by hand, cutting out at each stroke a certain width in the row of plants at uniform intervals. This motion is given the knife by means of the ratchet-wheel J, which is fast on the shaft E, or attached to the wheel D. The ratchet-wheel J has a ratchet-tooth or a cavity for each stroke of the knife. On the forward end of the knife-shaft H is a pawl-finger, K, which stands at right angles with the shaft and enters the cavities in the wheel J. L is a spring, the butt-end of which is attached to the rear end of the frame A. Its other end bears upon the finger K with a constant pressure. The traction-wheel D revolves in the direction indicated by the arrow. N represents the cavities and teeth or shoulders in the wheel J. As this wheel revolves the point or end of the finger will be carried upward by each tooth or shoulder, and each time it will be forced back by the spring. This action vibrates the shaft and gives the knife the chopping motion already described. O represents cultivator-teeth which may be attached to the frame for cutting weeds or stirring the soil. The rake P (see Fig. 3) may be attached to the frame for raking off the loose weeds or cotton-plants which may have been cut up, or for other purposes. The traction-wheel D is made to run between the rows or near the row which is being chopped. The cultivator may be adjusted on the frame so as to work on one or both sides of the row, either as scrapers or to turn the soil.

I do not limit or confine myself to the precise form or arrangement of any of the parts described, as they may be varied in many ways without departing from my invention.

Having thus described my invention, I claim as new and desire to secure by Letters Patent—

The combination, with a chopping-knife on the arm G, of a shaft, H, journaled in brackets I I, and having spring-finger $k$ and a ratchet-wheel, J, on the driving-shaft of the machine, as and for the purpose set forth.

ASHLEY G. POWELL.

Witnesses:
   J. C. HOOD, Jr.,
   SAM. P. HORTON. (43)